Oct. 5, 1954
R. W. VERGOBBI
2,690,857
MATERIAL FEEDING APPARATUS AND MATERIAL
ACTUATED CONTROL MEANS THEREFOR
Filed April 14, 1950
3 Sheets-Sheet 1
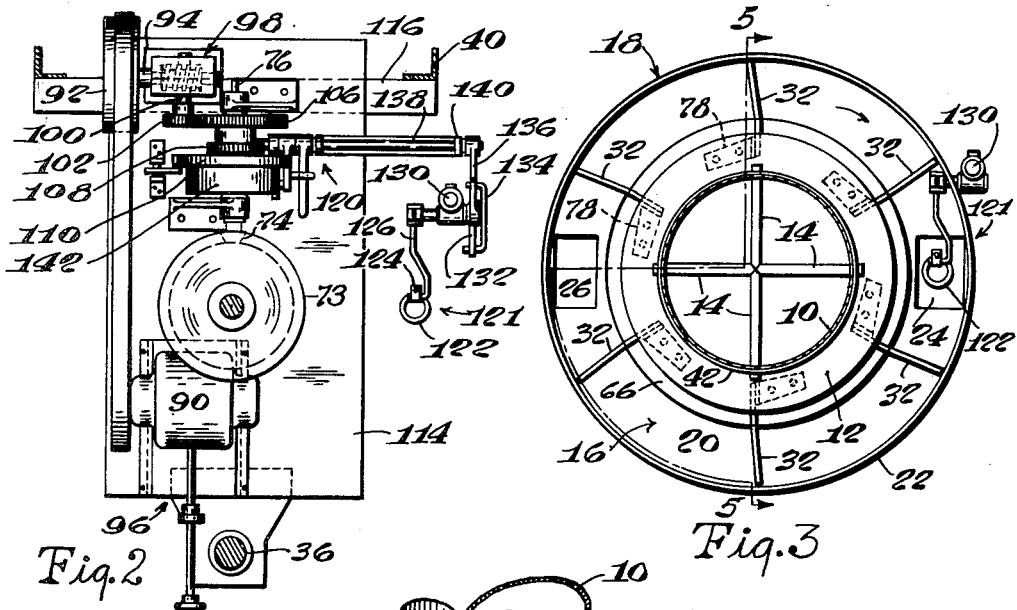
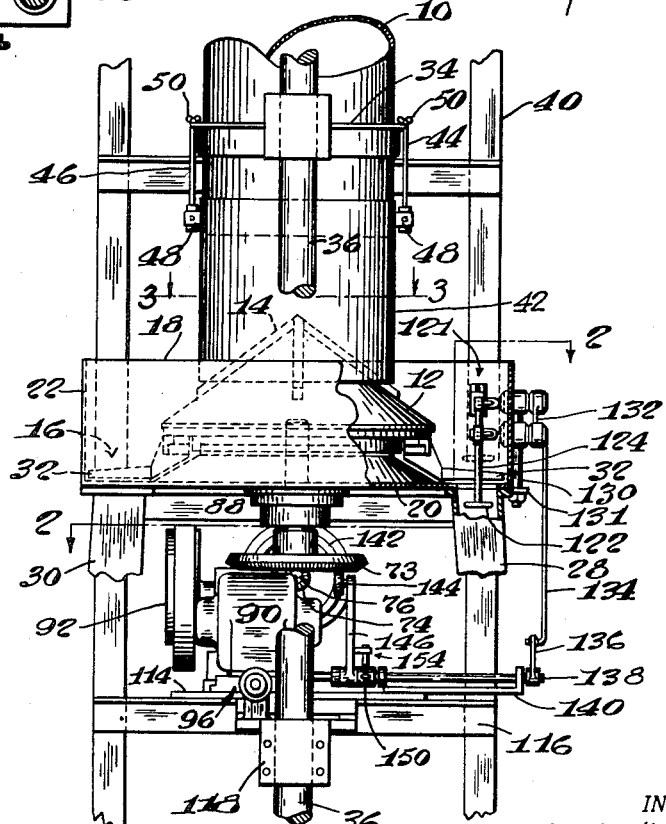
INVENTOR.
Robert W. Vergobbi
BY
J. Stanley Churchill
ATTORNEY Oct. 5, 1954 R. W. VERGOBBI 2,690,857
MATERIAL FEEDING APPARATUS AND MATERIAL
ACTUATED CONTROL MEANS THEREFOR
Filed April 14, 1950 3 Sheets-Sheet 2
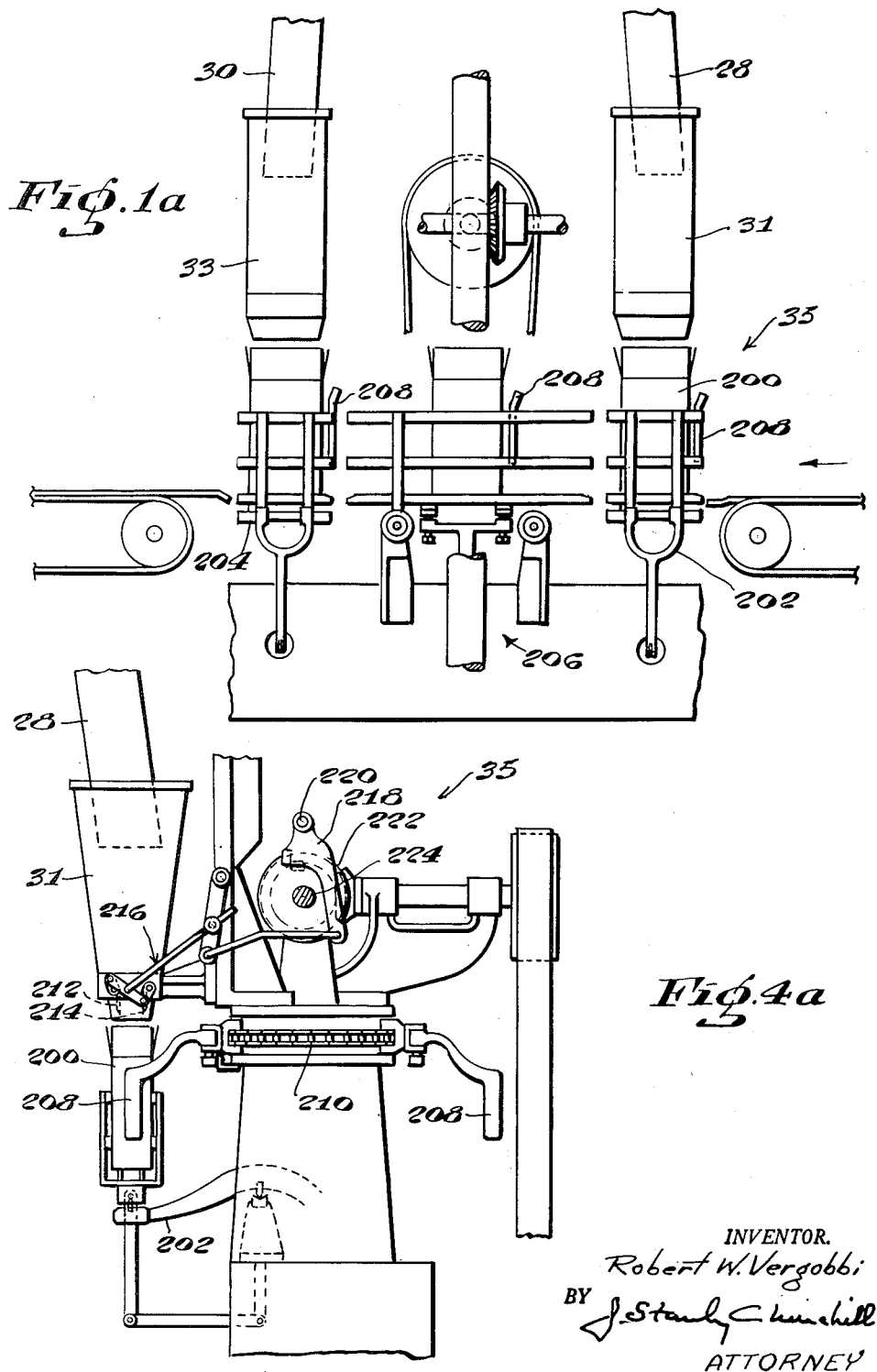
INVENTOR.
Robert W. Vergobbi
BY J. Stanley Churchill
ATTORNEY Oct. 5, 1954  R. W. VERGOBBI  2,690,857
MATERIAL FEEDING APPARATUS AND MATERIAL
ACTUATED CONTROL MEANS THEREFOR
Filed April 14, 1950  3 Sheets-Sheet 3
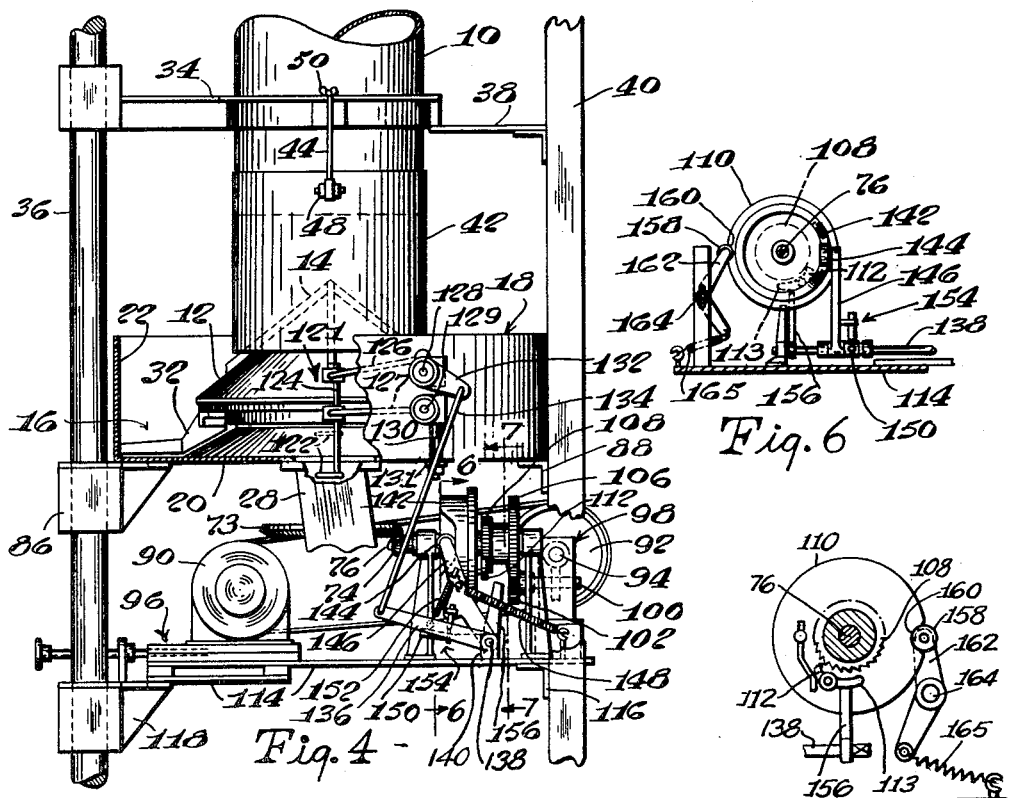
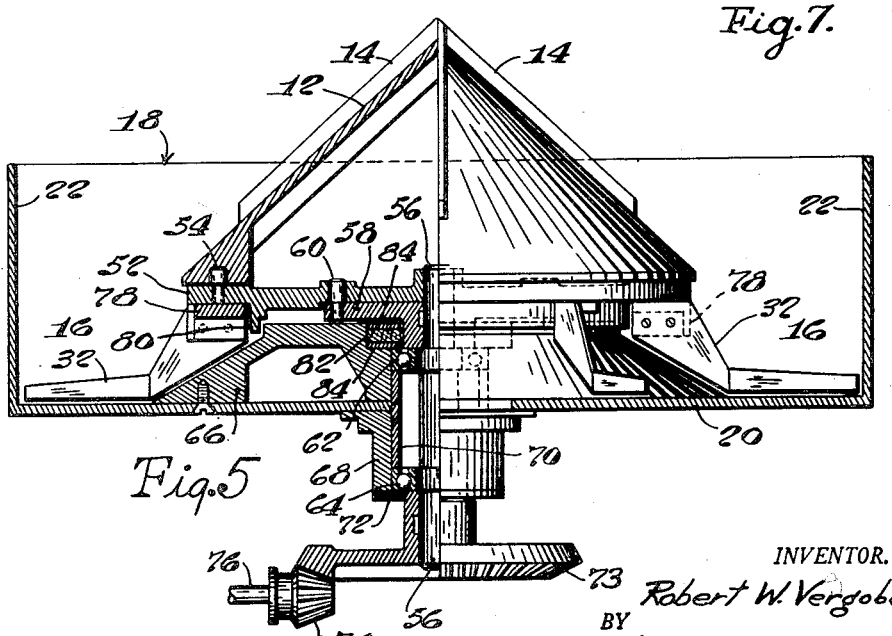
INVENTOR.
Robert W. Vergobbi
BY
J. Stanley Churchill
ATTORNEY Patented Oct. 5, 1954

2,690,857

UNITED STATES PATENT OFFICE 2,690,857

MATERIAL FEEDING APPARATUS AND MATERIAL ACTUATED CONTROL MEANS THEREFOR

Robert W. Vergobbi, Quincy, Mass., assignor to Pneumatic Scale Corporation, Limited, Quincy, Mass., a corporation of Massachusetts Application April 14, 1950, Serial No. 155,823

2 Claims. (Cl. 222—56)

This invention relates to a material feeding apparatus and material actuated control means therefor.

The invention has for an object to provide a novel and improved material feeding apparatus particularly adapted for efficiently feeding in a uniform stream certain types of finely divided non-freely flowing materials, such as prepared cake or pie-crust mixtures which tend to pack together and are otherwise difficult to feed in a uniform stream.

With this general object in view, and such others as may hereinafter appear, the invention consists in the material feeding apparatus and in the various structures, arrangements and combination of parts hereinafter described and particularly defined in the claims at the end of this specification.

In the drawings illustrating the preferred embodiment of the invention, Fig. 1 is a front elevation of the present material feeding apparatus illustrating the upper portion thereof as embodied in a weighing machine; Fig. 1a is a continuation of Fig. 1 showing the bulk and dripfeed stations of a weighing machine; Fig. 2 is a plan view of the lower portion of the material-feeding apparatus as viewed from the line 2—2 of Fig. 1; Fig. 3 is a plan view of the upper portion of the feeding apparatus as seen from the line 3—3 of Fig. 1 with the framework removed; Fig. 4 is a side elevation of the device and illustrating control mechanism for starting and stopping the feeding operation in accordance with the supply of material; Fig. 4a is a continuation of Fig. 4 showing the weighing machine; Fig. 5 is a cross-sectional view taken on the line 5—5 of Fig. 3; Fig. 6 is a detail view in front elevation of a portion of the control mechanism shown in Fig. 4; and Fig. 7 is a detail view of the pawl and ratchet clutch mechanism as viewed from the line 7—7 of Fig. 6.

Prior to the present invention considerable difficulty has been experienced in the packaging and feeding certain non-freely flowing materials, such as prepared cake and pie-crust mixtures during the packaging operations because of the fact that these mixtures embody shortening materials and tend to pack together in the feed conduits. These difficulties have been experienced during the feeding of the mixtures to a weighing machine.

Accordingly, the present invention contemplates a novel and highly efficient construction of material-feeding means by which provision is made for gently separating and withdrawing the material to be fed from the supply hopper with minimum agitation and for delivering the same into an annular chamber from which a continuous and substantially uniform stream of the material in a loose and freely flowing condition may be delivered to the weighing or other packaging machine. Provision is also made for controlling the material-feeding operation in a novel and highly efficient manner as will be described.

Referring now to the drawings, the present material-feeding apparatus comprises a supply hopper 10 through which the material may flow by gravity from a source of supply and a rotatable feed cone 12 provided on its conical surface with a plurality of agitating elements in the form of radial vanes or blades 14. The small end of the feed cone is mounted to extend upwardly into the end of the hopper to effect a slight agitation and loosening of the material at the mouth of the supply hopper causing the material to spread out loosely and evenly as it flows by gravity down the surface and to the base end of the feed cone. The feed cone 12 is proportioned relative to the hopper 10 so that the base of the cone is disposed below and is of a substantially greater diameter than the delivery end of the supply hopper, and, the clearance space between the bottom edge of the hopper and the adjacent cooperating surface of the cone is preferably relatively small in order to permit control of the flow of the material during rotation of the cone and to prevent gravitational flow of the material through such clearance space when rotation of the cone is discontinued.

In operation, the separated material flowing from the base of the feed cone in a loose and free flowing condition is received in an annular chamber 16 defined by a cylindrical drum 18 open at the top and having a bottom wall 20 and an upstanding rim portion 22 spaced from and surrounding the feed cone 12. The bottom wall 20 of the drum 18 may be provided with one or more discharge openings, as indicated at 24, 26 in Fig. 3, which may communicate with material delivery funnels 28, 30 respectively leading to the usual bulk and drip load feed hoppers, 31, 33, of a commercial two scale weighing machine indicated generally at 35, such for example, as the two scale weighing machine illustrated and described in the United States patent to Howard, No. 1,724,591, dated August 13, 1929, to which reference may be made. The material delivered to the annular chamber 16 in its loose and free flowing condition is conveyed in a circular path through the chamber by a plurality of radially extended pusher arms 32 arranged to rotate with the feed cone and to convey the material to the discharge openings 24, 26 where it falls by gravity into the delivery funnels 28, 30.

As illustrated in Figs. 1 and 4, the supply hopper 10 may comprise a vertically elongated tubular member supported by an annular bracket 34 extended from a vertical standard 36 forming a part of the machine frame, and, may be further supported by extensions 38 from an upstanding frame 40 on the opposite side of the feeding apparatus. The lower end of the supply hopper 10 may and preferably will be provided with a separate vertically adjustable tube 42 telescopically fitted over the end of the tubular member 10 and arranged to be vertically adjusted relative to the feed cone 12 by a pair of opposed links 44, 46 pivotally connected at their lower ends to lugs 48 secured to the tube 42 and detachably connected at their upper ends to a flanged portion of the annular bracket 34. The upper ends of the links 44, 46, may be threaded and provided with wing nuts 50 for vertically adjusting the tube 42 to change the clearance space between the end of the hopper and the surface of the cone, and thus vary the rate of feed for most efficient operation. It will be observed that the adjustable tube 42 telescopically fitted over the end of the main hopper 10 permits a slight expansion of the material as it passes from the end of the hopper 10 into the tube 42 so as to facilitate movement of the material by gravity through the mouth of the hopper and upon the surface of the feed cone 12.

As best shown in Fig. 5, the rotatable feed cone 12 may be mounted on a substantially flat disk 52 provided with upstanding pins 54 arranged to fit into openings formed in the underside of the cone, thus forming an easily and quickly separable connection for convenience in disassembling unit for cleaning purposes. The disk 52 is loosely fitted on a central shaft 56 and is similarly connected to a flanged disk 58 by upstanding pins 60 secured to the disk 58 and engageable with openings formed in the disk 52 rendering the unit easily removable for cleaning purposes. The flanged disk 58 is keyed to the central shaft 56, and the shaft is rotatably mounted in ball bearings 62, 64 supported in the hub portions of upper and lower bearing numbers 66, 68 respectively which are secured to the upper and lower surfaces of the bottom wall 20 of the cylindrical drum 18, as illustrated. A spacing bushing 70 extends between the ball bearings 62, 64 and a retaining member 72 may be secured to the lower end of the bearing member 68. A bevel gear 73 is secured to the lower end of the shaft 56 and is arranged to mesh with a bevel pinion 74 fast on a shaft 76 forming a part of the driving mechanism.

As herein shown, the upper bearing member 66, disposed within the cylindrical drum 18 is substantially conically shaped to form outwardly and downwardly inclined surfaces defining the inner walls of the annular chamber 16, and, the radially extended pusher arms 32 which are secured to brackets 78 attached to the underside of the disk 52 are preferably angularly shaped to conform to the downwardly inclined wall and the horizontal bottom wall of the chamber, the lower edges of the pusher arms being preferably slightly spaced from the walls of the chamber, as shown. As illustrated in Fig. 3, the pusher arms may be bent slightly rearwardly with relation to their direction of rotation whereby to spread the material substantially uniformly in the chamber and to maintain the material in a relatively loose and free flowing condition.

In practice, the rate of feed may be regulated so as to prevent an excessive accumulation or height of material in the chamber, the height of the material being preferably substantially equal to the height of the horizontally extended portions of the pusher arms during normal continuous operation of the feeding device. It will be observed that the inclined inner walls of the chamber tend to urge the material away from the upper end of the bearing member 66, and, in order to prevent leakage and accumulation of the material inwardly between the flat disk 52 and the bearing member 66, the disk 52 may be provided with a skirt portion 80 surrounding the upper end of the member 66, as illustrated. A felt seal 82 may also be provided about the hub portion of the flanged disk 58, the seal being protected by upper and lower metal washers 84 and disposed in a recessed portion of the upper end of the bearing member 66. As illustrated in Figs. 1 and 4, the cylindrical drum 18 may be supported from the framework of the apparatus by a bracket 86 extending from the vertical standard 36 and by an angle bar 88 secured to the frame member 40.

Provision is made for rotating the feed cone 12 and the pusher arms 32 simultaneously and at a relatively slow rate approximately in the order of four or five revolutions per minute, through connections from an electric motor 90 belted to a pulley 92 fast on a shaft 94, the motor being mounted for longitudinal adjustment, as indicated at 96, to maintain the driving belt in a taut condition. The shaft 94 comprises the input shaft of a worm gear reduction unit 98, the output shaft 100 being provided with a pinion 102 meshing with a gear 106 loosely mounted on the drive shaft 76. The loosely mounted gear 106 is formed integrally with a ratchet 108. A pawl carrier disk 110 fast on the shaft 76 is provided with a spring-pressed pawl 112 for cooperation with the ratchet 108 to effect driving of the shaft 76 and rotation of the feed cone and pusher arms, as described. The driving mechanism may be mounted on a platen 114 supported from the frame of the machine by an angle bar 116 and bracket 118, as illustrated in Fig. 4. From the description thus far, it will be observed that the material may be gently and uniformly fed in a loose and free flowing condition and at a substantially constant rate from the supply hopper 10 to the delivery funnels 28, 30 for delivery to the bulk load and drip load feed hoppers 31, 33 of a two-scale weighing machine 35 or other material-receiving point.

Provision is made in the preferred embodiment of the invention for controlling the operation of the feed cone in accordance with the supply of material in the material delivery funnels whereby to assure maintenance of a substantially uniform head of material in the delivery funnels leading to the feed hoppers and to prevent excessive accumulation of material in the annular chamber 16 whereby to avoid undue agitation of the material by the pusher arms 32. In operation, the present control mechanism is arranged to permit continuance of operation of the feed cone 12 as long as at least one of the delivery funnels is open to receive the material being transferred thereto by the pusher arms so as to maintain a continuous flow of the material through the chamber. When both delivery funnels are filled to the top, that is, to a height or level corresponding to the bottom wall of the chamber 16, the control mechanism is arranged to discontinue operation of the feed cone 12 so as to avoid an excessive accumulation of material in the annular chamber and preventing undue agitation thereof. Such undue agitation is particularly undesirable when feeding non-freely flowing materials, such as piecrust mix, having lumpy particles and embodying shortening materials which may be adversely affected by agitation. In practice, the control mechanism, indicated generally at 120, may be arranged to cooperate with the material in the upper ends of either of the delivery funnels 28, 30. However, in the illustrated embodiment of the invention, the control mechanism 120 may and preferably will be arranged to cooperate with the material in the upper end of the funnel 28 leading to the bulk load hopper since the material is usually withdrawn in larger quantities from the bulk load hopper than from the drip load hopper so that if the material in the bulk load funnel is maintained at a substantially constant level flush with the bottom wall of the chamber 16, the drip load funnel will also be provided with sufficient material to maintain such level since any surplus material not required by the drip load funnel will be carried around the annular chamber by the pusher arms 32 to fall into the bulk load funnel until the latter is filled whereupon the control mechanism will be operated to discontinue the feed of the material.

As illustrated in Fig. 4, the control mechanism 120 includes a vertically reciprocal feeler member 121 disposed above the discharge outlet to the delivery funnel 28 and comprises an annular member 122 formed at the lower end of a vertical rod 124 carried at the outer ends of parallel arms 126, 127, secured to rocker shafts 128, 129 respectively, forming a parallel linkage. The shafts 128, 129 are journaled in bearings supported on a standard 130 attached to an extension 131 from the bottom wall 20 of the drum, as shown in Fig. 4, the shafts extending through the upstanding wall 22. The upper shaft 128 is provided with an arm 132 connected by a link 134 to an arm 136 fast on a control shaft 138. The shaft 138 is supported in a bracket 140 attached to the platen 114, as shown.

Provision is made for rocking the shaft 138 to effect reciprocation of the feeler member 121 into and out of engagement with the material at the upper end of the funnel 28 between the limits indicated by the full and dotted line positions of the annular member 122, shown in Figs. 1 and 4, the feeler member being reciprocated in timed relation to the rotation of the feed cone 12 and the pusher arms 32 in order to avoid interference with the pusher arms during their passage over the discharge outlet 24. The material engaging end 122 of the feeler member is preferably annular in shape in order to prevent undue compression or agitation of the material and to permit the material to flow freely therethrough during normal feeding operation. As herein shown, the shaft 138 is arranged to be rocked by a cam 142 formed integrally with the pawl carrier disk 110 fast on the shaft 76, and a cooperating cam roll 144 carried by an arm 146 pivotally mounted on the control shaft 138, a spring 148 being arranged to hold the roll against its cam. The pivotally mounted arm 146 is arranged to cooperate with an arm 150 fast on the shaft 138, and as herein shown, the arm 150 is connected to rock with the arm 146 by a spring 152, the arm 146 having an extension engageable with the arm 150, as indicated at 154.

Thus, in the operation of the feeding device, when the arm 146 is rocked by the cam 142 in a counterclockwise direction viewing Fig. 4, the arm 150 is engaged by the arm 146 to positively rock the shaft 138 in a direction to effect elevation of the feeler unit 121. Conversely, when the arm 146 is rocked in a clockwise direction viewing Fig. 4, the arm 150 will normally follow the arm 146 by virtue of the spring connection 152 to effect descent of the feeler unit. However, in the event that the feeler unit is restrained in its descent by engagement with the material at the upper end of the delivery funnel at a level substantially flush with the bottom wall of the chamber 16, indicating that the funnel is filled, the spring 152 will be extended and the arm 150 will not follow the arm 146. When such restraint of the feeler unit occurs, provision is made for disengaging the pawl 112 from its ratchet 108 to discontinue rotation of the feeding device. As herein shown, disengagement of the pawl may be effected by a pawl stop arm 156 fast on the control shaft 138 and which is arranged to be rocked into and out of the path of the tail 113 of the pawl 112 each cycle of operation. The pawl stop arm 156 is normally rocked out of the path of the tail 113 of the pawl each cycle to permit continuous operation of the feeding device until such time as the feeler unit is restrained from downward movement, as described, whereupon the pawl stop arm will be held in the path of the pawl to engage the tail 113 and effect rocking of the pawl to disengage the same from its ratchet and discontinue operation of the feeding device. Thereafter, during continued withdrawal of material from the delivery funnel 28 by the weighing machine feed hopper 31, the level of the material in the funnel will descend whereupon the feeler unit will likewise descend and effect withdrawal of the pawl stop arm 156 by virtue of the spring connection 152 and the linkage described to again permit engagement of the spring-pressed pawl 112 with its ratchet 108 to effect rotation of the feeding device. A spring urged roller 158 engageable with a cut-out portion comprising a semi-circular slot 160 in the periphery of the pawl carrier disk 110 is arranged to bring the drive shaft 76 to rest in a predetermined position immediately after the pawl 112 is disengaged from its ratchet. As shown in Fig. 6, the roller 158 may be carried by one arm of a bell crank 162 pivotally mounted at 164, the other arm of the bell crank being connected by a spring 165 to the platen 114. As above stated, the present material-feeding apparatus is herein illustrated as embodied in a two-scale weighing machine of the type illustrated and described in the Howard Patent No. 1,724,591, and only sufficient portions of the weighing machine are herein illustrated and described as appear to be necessary for a complete understanding of the present invention. In general, in the operation of such two-scale weighing machines a bulk or primary load is introduced into a carton 200 on a scale beam 202 at the first weighing station, and a drip or final load is introduced into the carton on a second scale beam 204 at the second weighing station, the usual material-settling station 206 being provided between the first and second weighing stations. Such prior weighing machines are further adapted to operate in successive cycles wherein the weighing operation is performed during one-half cycle of operation, and when the scales have completed their weighing operations, the second-half cycle of operation is initiated during which the cartons are intermittently advanced one station of operation by conveyer mechanism herein illustrated as including a series of carrier arms 208 attached to an endless chain 210. It will be understood that suitable provision is made for controlling the operation of the machine so that the carton-moving period of operation cannot start until both scales have completed their independent weighing operations, all as fully described in the Howard Patent No. 1,724,591.

As illustrated in Figs. 1a and 4a, the material-delivery funnels 28, 30 are arranged to deliver the material into the bulk and drip-load feed hoppers 31, 33 respectively, each feed hopper being provided with a pair of shutters 212, 214 arranged to be closed to interrupt the stream of material at the end of the carton-filling operation. The shutters may be connected by linkage, indicated generally at 216, to a yoke arm 218 pivotally mounted at 220 and which forms a part of the usual control mechanism for shutter operation in a two-scale weighing machine as shown in the Howard patent above referred to. In the operation of such shutter mechanism, the yoke arm 218 is arranged to be rocked to open and close the shutters by a cam disk 222 loosely mounted on a main driving shaft 224, the cam disk being permitted to rotate in successive half revolutions at the start and end of each weighing period through mechanism controlled by the operation of the scale beam when the scale makes its weight and by suitable resetting mechanism, all as shown and described in the Howard patent.

From the above description of the preferred embodiment of the invention it will be observed that the present material feeding device is particularly adapted to handle non-freely flowing materials such as prepared cake or pie-crust mixtures and is capable of separating such materials to render them substantially loose and free flowing and to maintain the same in a free flowing condition during the feeding operation in a novel and efficient manner. It will also be observed that the present material feeding device is provided with control mechanism adapted to automatically discontinue operation of the feeding device when the delivery funnels are filled to a height corresponding to the bottom wall of the chamber 16 whereby to prevent excessive accumulation and undue agitation of the loosened and free-flowing material within the chamber 16, and to again automatically start operation of the feeding mechanism when such supply is partially withdrawn from the funnels whereby to maintain a substantially constant and uniform supply of material in its loose and free flowing condition passing through the feeding device. It will also be observed that when the present feeding device is used for feeding material to a weighing machine, the present control mechanism is adapted to maintain a substantially constant and uniform head of material in the delivery funnels which is conducive to accurate weighing operations.

While the preferred embodiment of the invention has been herein illustrated and described, it will be understood that the invention may be embodied in other forms within the scope of the following claims.

Having thus described the invention, what is claimed is:

1. A feeding device for non-freely flowing materials comprising a supply hopper, a rotatable feed cone having the apex thereof extended into the mouth of the hopper, said feed cone having agitating elements on the surface thereof for effecting loosening of and withdrawal of the material from the hopper during rotation of the cone, an annular chamber disposed to receive the material as it flows from the base of the cone in a loose and free-flowing condition, a discharge outlet in the bottom wall of the chamber, a material-delivery funnel communicating with said outlet, conveying means for moving the material through said annular chamber to fall into said delivery funnel, means for driving said feed cone and said conveying means, and control means cooperating with the material in the delivery funnel and operatively connected to said driving means arranged to discontinue the operation of the feed cone when the funnel is filled to a level corresponding substantially to the bottom wall of the chamber whereby to prevent accumulation of material in the chamber after the funnel is filled, and to again initiate operation of the feed cone when the material falls below said level, said control means including a vertically reciprocable feeler member movable from said chamber into and out of the upper end of said delivery funnel, operating means for cyclically reciprocating said feeler through a lost-motion connection whereby said feeler may be restrained in its descent by material in the upper end of the funnel at said level without stopping said operating means, and means responsive to restraint of said feeler to effect termination of rotation of said feed cone and conveying means.

2. A feeding device as defined in claim 1 wherein said means for driving said feed cone includes a separable driving connection having a control element movable with the driven portion thereof, an actuator element connected to said feeler, said actuator element being normally disposed in the path of movement of said control element but cyclically movable out of said path upon reciprocation of said feeler without restraint, when said feeler is restrained as described said actuator element remaining in said path to engage said control element to thereby effect separation of said separable driving connection.

References Cited in the file of this patent
UNITED STATES PATENTS

| Number | Name | Date |
|---|---|---|
| 477,327 | Gribben et al. | June 21, 1892 |
| 592,774 | Frazier | Nov. 2, 1897 |
| 1,657,037 | Ripley | Jan. 24, 1938 |
| 2,202,269 | Ryder | May 28, 1940 |
| 2,276,382 | Francis | Mar. 17, 1942 |
| 2,408,221 | Michel | Sept. 24, 1946 |